United States Patent
Fox et al.

(10) Patent No.: US 9,338,296 B2
(45) Date of Patent: May 10, 2016

(54) SYSTEM AND METHOD FOR DRIVING A VIRTUAL VIEW OF AGENTS IN A CONTACT CENTER

(71) Applicant: Avaya Inc., Basking Ridge, NJ (US)

(72) Inventors: Ronan Fox, County Galway (IE); Sean Burke, Knocknacarra (IE); Tommy Morris, County Galway (IE); Ruth Gibson, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 84 days.

(21) Appl. No.: 14/135,945

(22) Filed: Dec. 20, 2013

(65) Prior Publication Data

US 2015/0181038 A1    Jun. 25, 2015

(51) Int. Cl.
| | |
|---|---|
| *H04M 3/00* | (2006.01) |
| *H04M 5/00* | (2006.01) |
| *H04M 3/51* | (2006.01) |
| *G06Q 10/06* | (2012.01) |

(52) U.S. Cl.
CPC ....... *H04M 3/5175* (2013.01); *G06Q 10/06393* (2013.01)

(58) Field of Classification Search
USPC ............................ 379/265.06, 265.08, 265.09
See application file for complete search history.

(56) References Cited

U.S. PATENT DOCUMENTS

| | | | | |
|---|---|---|---|---|
| 7,386,467 | B2 * | 6/2008 | Eitel | H04M 3/523 379/265.07 |
| 2003/0048893 | A1 * | 3/2003 | McIllwaine | G06Q 10/06398 379/265.06 |
| 2004/0138944 | A1 * | 7/2004 | Whitacre et al. | 705/11 |
| 2012/0093306 | A1 * | 4/2012 | McCormack | H04M 3/5233 379/265.01 |
| 2014/0022328 | A1 * | 1/2014 | Gechter | G06Q 30/06 348/14.02 |
| 2014/0086404 | A1 * | 3/2014 | Chishti | H04M 3/5232 379/265.12 |
| 2014/0095167 | A1 * | 4/2014 | Lynch et al. | 704/270.1 |
| 2014/0181676 | A1 * | 6/2014 | Samborskyy et al. | 715/736 |

* cited by examiner

*Primary Examiner* — Quynh Nguyen

(57) ABSTRACT

A system for driving a virtual view of agents of a contact center is provided. The system includes a monitoring module for monitoring and detecting a breach in threshold associated with at least one key performance indicator of at least one agent from a plurality of agents. The system further includes a ranking module for calculating a rank of at least one agent among the plurality of agents based on predefined rules. The system further includes a driving module for driving a display of the virtual view of the plurality of agents based on the calculated rank of the at least one agent.

19 Claims, 4 Drawing Sheets

SYSTEM AND METHOD FOR DRIVING A VIRTUAL VIEW OF AGENTS IN A CONTACT CENTER

BACKGROUND

1. Field of the Invention

Embodiments of the present invention provide a system and a method for monitoring and managing contact center operations. More particularly, embodiments of the present invention provide a system and a method for driving a virtual view of agents of the contact center.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment the contact center becomes aware of the contact until the contact is connected to an agent are client or operator-specifiable (i.e., programmable by the operator of the contact center), via a capability called vectoring.

Normally in present-day Automatic Call Distributions (ACDs) when the ACD system's agent assisting system detects an agent has become available to handle a contact, the agent assisting system identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways that are service level and match rate.

Service level is one measurement of contact center efficiency. Service level is typically determined by dividing the number of contacts accepted within the specified period by the number accepted plus the number that were not accepted, but completed in some other way (e.g., abandoned, given busy, canceled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators ("KPIs"), such as average revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when KPIs are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers.

Typically, when a new work request arrives into a contact center, a most suitable agent to work on it is selected by the contact center to handle the work request. However, all agents are not at same level in the contact center. Some of the agents are very skilled (also called gold rated agents), but some of the agents are not very skilled, but having some minimum skills (also called silver rated agents). Hence, it is possible that all gold rated agents are busy at some time. The contact center may forward calls at those times to silver rated agents. However, as discussed above, silver rated agents have only basic skill level, and there is no guarantee that those calls will be handled at same quality provided by gold rated agents. Hence, customers at those calls will remain unsatisfied by the handling of their calls, and this may affect business of contact center.

Further, some of the agents may require help or assistance during handling of the calls. For example, if a less skilled agent is handling some call due to unavailability of high skilled agent, the less skilled agent may require help or assistance of his/her manager. However, there are many agents in the contact center, and these many agents may require a manager's help at same time or at different time. However, a manager typically faces a difficulty in deciding to which agent he should provide help first.

This is because of the fact that the managers do not have context-sensitive real time information on agents mapped in a way that reflects continually changing physical distribution of agents in a call center. Hence, the managers have to keep a mental map of agents (which is a continually changing), agent's positions, various metrics associated with performance of agents, and the distribution of resources in the call center.

Therefore, there is a need for a system and method capable of providing the manager of the contact center relevant and most important context-sensitive real time information on agents with a physical distribution of agents in the call center.

SUMMARY

Embodiments in accordance with the present invention provide a system for driving a virtual view of agents of a contact center. The system includes a monitoring module for monitoring and detecting a breach in a threshold value associated with at least one key performance indicator of at least one agent from a plurality of agents. The system further includes a ranking module for calculating rank of at least one agent among the plurality of agents based on predefined rules. The system further includes a module for driving a display of the virtual view of the plurality of agents based on the calculated rank of the at least one agent.

Embodiments in accordance with the present invention further provide a computer-implemented method for driving a virtual view of agents in a contact center. The computer-implemented method includes monitoring key performance indicators associated with a plurality of agents, and detecting a breach in a threshold value associated with at least one key performance indicator of at least one agent from the plurality of agents. The computer-implemented method further includes calculating a rank of at least one agent among the plurality of agents based on predefined rules. The computer-implemented method further includes driving a display of the virtual view of the plurality of agents based on the calculated rank of the at least one agent.

Embodiments in accordance with the present invention further provide a computer-implemented method for driving a virtual view of agents in a contact center. The computer-implemented method includes receiving a virtual view of a plurality of agents. The computer-implemented method further includes monitoring key performance indicators associated with a plurality of agents, and detecting a breach in a threshold value associated with at least one key performance indicator of at least one agent from the plurality of agents. The computer-implemented method further includes calculating a rank of at least one agent among the plurality of agents based on predefined rules. The computer-implemented method further includes driving a display of the virtual view of the plurality of agents based on the calculated rank of the at least one agent. The computer-implemented method further includes providing a real-time video of an agent having maximum rank among the plurality of agents.

Further, the present invention can provide a number of advantages depending on its particular configuration. First, embodiments of the present invention provide a system and a method that utilizes real-time agent statistics to drive a virtual view of agents, and hence a manager or supervisor does not have to manually drive the virtual view. Further, embodiments of the present invention provide multiplexing video feeds with the virtual view, thereby allowing the supervisor to directly connect with agents who are experiencing problems. Further, embodiments of the present invention provide an algorithm that is used to rank the agents to ensure that most important video feeds are brought to the foreground of the manager. Further, embodiments of the present invention provide virtual view of agents presented visually in a carousel-view of video feeds.

Further, embodiments of the present invention enable the manager to get contextual real-time statistics on individual agents, thereby allowing the manager to intuitively navigate and discover the source of a problem which may be agent-originated in the contact center. Further, embodiments of the present invention enable a manager to interact with their agents based on rank of agents without leaving their desks, or even from a remote location. Furthermore, the present invention enables the manager or supervisor to track their agents even if the contact center employs hot desking.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
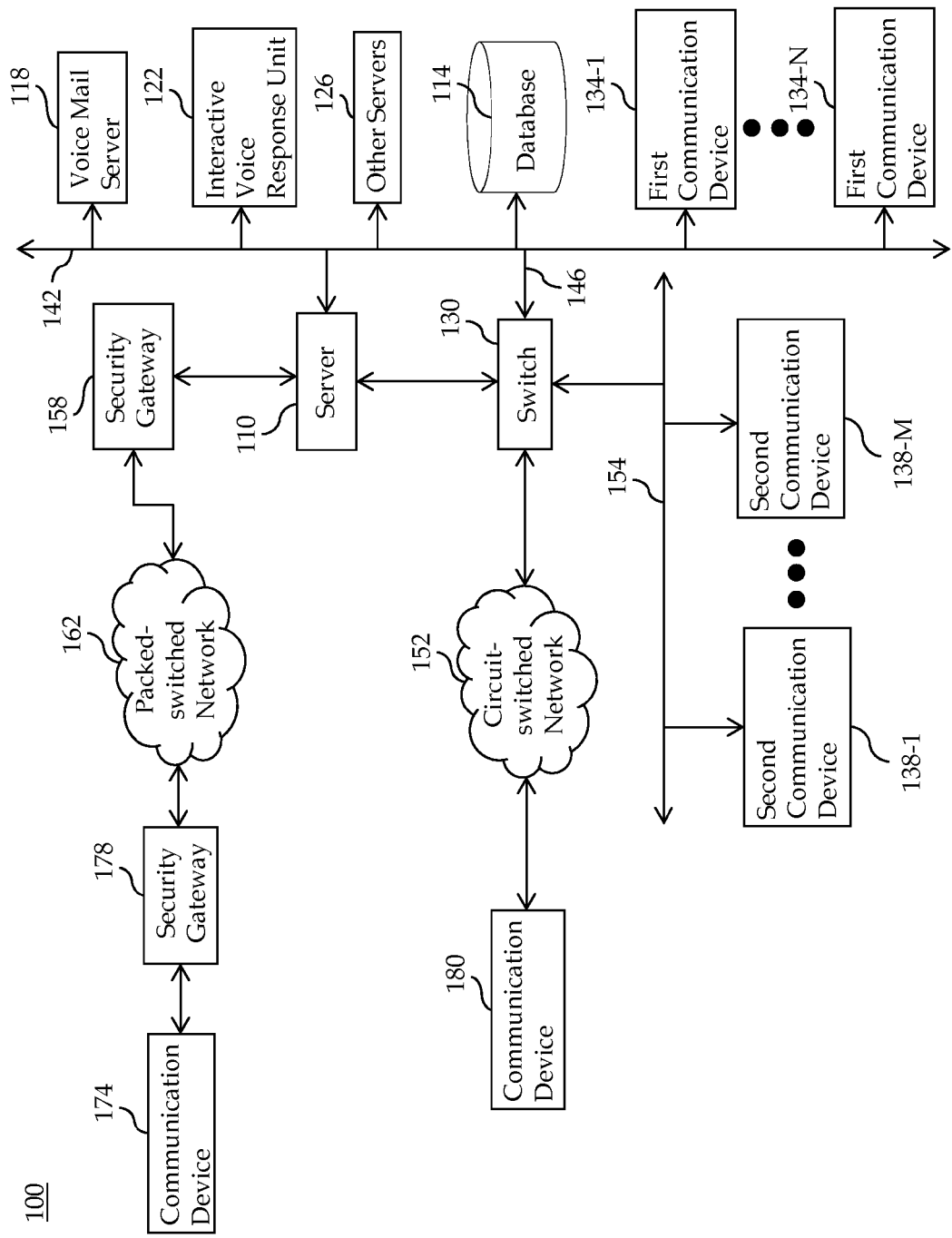
FIG. 1 shows an illustrative embodiment of a contact center, in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a server 110, a set of data stores or databases 114 containing contact or customer related information and other information that can enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network LAN 142, (or Wide Area Network WAN)). The servers can be connected via optional communication lines 146 to the switch 130. As will be appreciated, the other servers 126 can also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and the packet-switched network 162 to process communications passing between the server 110 and the network 162.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks. The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

In an embodiment, the security gateway 158 (as shown in FIG. 1) can be Avaya Inc.'s, G700 Media Gateway™ and may be implemented as hardware such as via an adjunct processor (as shown) or as a chip in the server.

The first communication devices 134-1-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch, or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a security gateway 178, and the circuit-switched network 154 with an external second communication device 180.

In a preferred configuration, the server 110, network 162, and first communication devices 134 are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

Figure 2:
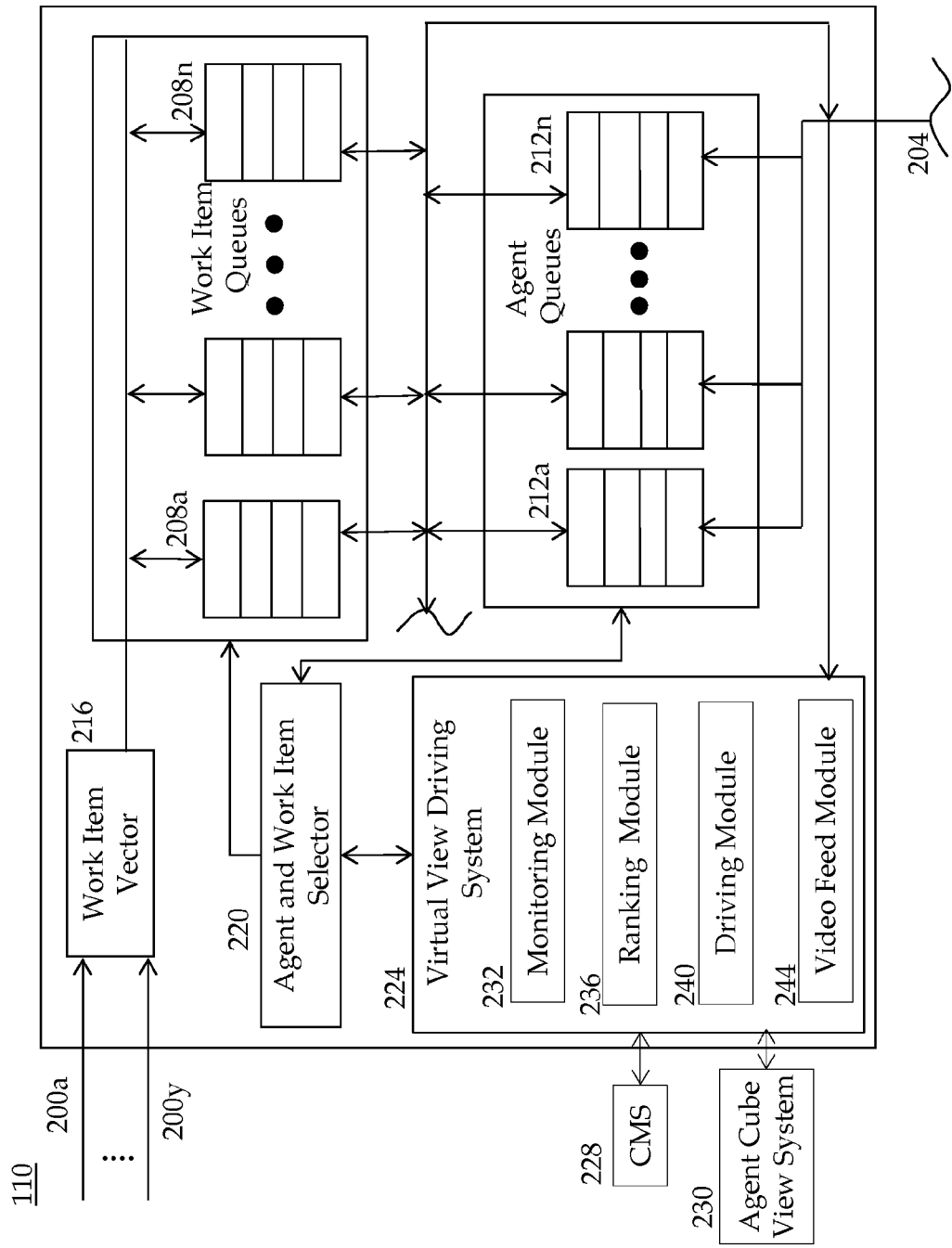
FIG. 2 is a block diagram of a server that could be used in the contact center of FIG. 1, in accordance with an embodiment of the present invention.

Further, as shown in FIG. 1, the contact center comprises the server 110, configuration of which is explained further in conjunction with FIG. 2 of the present invention. The server 110 further comprises a virtual view driving system 224 (shown in FIG. 2) as a preferred embodiment of the present invention. The detailed configuration of the virtual view driving system 224 is explained further in conjunction with FIG. 2 of the present invention.

In an exemplary embodiment, the virtual view driving system 224 is configured to drive a virtual view of the contact center agents based upon real-time operation statistics of the contact center. A rank for the agents is calculated based upon real-time operation statistics of the contact center, and the rank is utilized by the virtual view driving system 224 to drive the virtual view of agents. The operation statistics of the contact center may include, but are not restricted to call traffic, agent responsiveness time for new work requests, average handling time of work requests, target revenue of sales team and so forth. The call traffic may further include, but is not restricted to, telephone calls, web chats, audio messages, video messages, video calls, text messages, postings to social media sites, and postings to blog sites.

The virtual view driving system 224 may monitor operation statistics of the contact center. The virtual view driving system 224 may monitor key performance indicators associated with the agents as well. The virtual view driving system 224 may compare key performance indicators with their predefined thresholds and may determine a breach in any threshold value of the key performance indicators. The virtual view driving system 224 may calculate a rank of agents based upon a predetermined rules or formula, and may use the ranks to drive the virtual view of agents. Similarly, the virtual view driving system 224 may be configured to determine other unwanted situations such as, but not restricted to, higher agent responsiveness time for new work requests, higher average handling time of work requests, lower revenue of sales team and so forth.

The virtual view driving system 224 may further have access to the database 114, having stored therein personal and professional details of all the employees of the contact center. Further, the database 114 may have threshold values for each of the key performance indicators associated with agents. Further, the database 114 may store a formula or algorithm that is utilized to calculate rank of the agents. In addition, the virtual view driving system 224 may be configured to update the database 114.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as the LAN 142, as shown in FIG. 1, and/or a circuit switched voice line). The server 110 can include an operational contact center reporting module (not shown), such as Avaya IQ™, CMS™, Basic Call Management System™, Operational Analyst™, and Customer Call Routing or CCR™ by Avaya, Inc., gathers call records and contact-center statistics for use in generating contact-center reports.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, MultiVantage™PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

Moreover, as shown in FIG. 2, among the data stored in the server 110 is a set of contact or work item queues 208a-n and a separate set of agent queues 212a-n. Each contact queue 208a-n corresponds to a different set of agent queues, as does each agent queue 212a-n. Conventionally, contacts are prioritized and are either enqueued in individual ones of the contact queues 208a-n in their order of priority, or are enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item vector (or a control vector) 216 that controls work item routing process. Contacts incoming to the contact center are assigned by the control vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator (e.g., a supervisor or a manager of the contact center), and each of the contact queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

According to at least one embodiment, an agent and work item selector 220 (hereinafter, may be referred to as "selector 220") is provided. The selector 220 and the virtual view driving system 224 are embodied in the server 110. Further, the selector 220 monitors the occupants of the work item and queues 208a-n and 212a-n, respectively, and contact center objectives, rules, and policies and assigns agents to service work items. As will be appreciated, the server 110 is notified via the LAN 142 of an incoming contact by the communications component (e.g., switch 130, fax server, email server, web server, and/or other server) receiving the incoming contact. The incoming contact is held by the receiving communications component until the selector 220 forwards instructions to the component to forward or route the contact to a specific contact center resource, such as the interactive response unit 122, the voice mail server 118, and/or first or second communication device 134-1-N, 138-1-M associated with a selected agent. The selector 220 distributes and connects these contacts to communication devices of available agents based on the predetermined criteria noted above. When the selector 220 forwards a voice contact to an agent, the selector 220 also forwards customer-related information from databases 114 to the agent's computer work station for previewing and/or viewing (such as by a pop-up display) to permit the agent to better serve the customer. The agents process the contacts sent to them by the selector 220.

As shown in FIG. 2, an agent cube view system 230 provides a virtual view of agents of the contact center. In an embodiment, the virtual view includes virtual cube view of all agents of the contact center. The virtual cube view may be built by mapping exact coordinates of agent's desk to a series of photographs. In an embodiment, the series of photographs may be taken by using a wide angle lens. Those skilled in the art will appreciate that the wide angle lens will allow more of a scene to be included, as required in interior photography. The captured view of the cube of desks is substantially similar to an actual view seen by someone (e.g., a manager) passing through the desks. Further, photographs of each of the agents may be taken, and the photographs may be assigned to corresponding agent profile. In an embodiment, the virtual view of agents together with virtual view of their cubes may form a contact center virtual tour. The contact center virtual tour may include virtual view of agents with their cubes or desks (with corresponding background), and is substantially similar to a view that a manager will see if the manager physically passes through the cubes.

Further, in an embodiment of the present invention, the contact center may employ hot desking, wherein multiple agents may use a single physical work station (e.g., computer, laptop, phone) during different time periods (as opposed to each agent or staff member having their own personal desk). The agents may be assigned their desks daily depending upon their duties and responsibilities on a particular day. According to an embodiment of the present invention, each of the agents is provided with a sensor-enabled badge to keep a track of their location. The sensor-enabled badge may be read by readers (not shown in figure) distributed around the contact center to triangulate an approximate location of the agents. In another embodiment, instead of sensor-enabled badge, other location tracking techniques (for example, Near Field Communication or NFC) may be used to track the physical location of agents inside the contact center.

In an embodiment of the present invention, the CMS 228 (i.e., real-time reporting application) may integrate with the agent cube view system 230. According to an embodiment of the present invention, data originating from the CMS 228 may drive the virtual view provided by the agent cube view system 230. In an embodiment, each of the Key Performance Indicator (KPI) of agents is associated with a threshold value. The thresholds are pre-defined, and act as filters for driving virtual view of the agents. If the threshold associated with a particular KPI is breached by an agent, the agent may require attention/assistance of his manager. Similarly, many agents may require attention and assistance of the manager. According to an embodiment of the present invention, the manager provides assistance to an agent who requires most urgent attention or requires attention on a priority basis compared to other agents. The virtual view driving system 224 helps the manager to locate the agent requiring most urgent attention, and further facilitates direct interaction between the agent and the manager, so that the manager may help solving the issues/problem.

The virtual view driving system 224, as shown in FIG. 2, includes certain modules, such as, but not restricted to, a monitoring module 232, a ranking module 236, a driving module 240, and a video feed module 244.

The monitoring module 232 is configured to monitor various measures for each of the agent working in the contact center. In an embodiment, various measures include various Key Performance Indicators (KPIs), for example, an average revenue, an estimated wait time, an actual wait time, an average speed of answer, a throughput, an agent utilization, an agent performance, a customer satisfaction, a service level agreement, an average talk time, a total average call handling time, an agent responsiveness etc. According to an embodiment of the present invention, each of the KPIs is associated with a threshold value, which may be predefined and decided based upon a service level agreement or desired operational efficiency of the contact center. The monitoring module 232 may retrieve the various measures for each of the agent from the CMS 228.

Further, the monitoring module 232 is configured to detect a breach in any thresholds of the monitored measures for each of the agent. The monitoring module 232 may retrieve the thresholds from the database 114, and may compare the monitored measures (i.e., the KPIs) against the thresholds. In case any thresholds associated with any KPIs have been breached, the monitoring module 232 may notify the ranking module 236. For example, for a particular KPI (for example, average speed of answer), the monitoring module 232 may observe that a particular agent is answering only 2 calls per minute, but according to a predefined threshold, he should answer at least 3 calls per minute. The monitoring module 232 may detect such breaches in the predefined thresholds, and notify the ranking module 236.

The ranking module 236 is configured to calculate a rank for each of the agent associated with breached thresholds. According to an embodiment of the present invention, the ranking module 236 may utilize following formula to calculate rank for the agents.

$$R_a = \left( \sum_{i=1}^{n_a} \frac{((w_i))(\overline{x_{T_i}} - \overline{x_{i_a}})}{x_{T_i}} \right) / n_a$$

In the above formula, $R_a$ is the rating given to an agent 'a'. According to an embodiment of the present invention, $R_a$ is sum of absolute, normalized, weighted deviations from thresholds for the measures used in the rating calculation. Further, $w_i$ is the weighting assigned to the measure i, $x_{T_i}$ is the threshold value for measure i, $x_{i_a}$ is the value of measure i for agent a, and $n_a$ is the number of measures breaching the thresholds for the agent.

Further, according to an embodiment of the present invention, each agent is ranked based on the above formula or algorithm. The weightings work against a severity of zero to one, wherein one indicates very severe situation of a particular key performance indicator associated with an agent. The weighting is multiplied against the ratio of the absolute value of the threshold breach to the threshold as shown in the attached formula. The resultant weighted importance of the agents in terms of their threshold breaches is used to direct the view the user receives of the cubes. In an embodiment, only measures that breach the threshold for a specific agent are included in the above formula.

The driving module 240 is configured to drive the virtual view of the agents based on the calculated rank. In an embodiment of the present invention, an agent having maximum rank refers to an agent requiring most urgent attention of a manger of the contact center. The driving module 240 displays first, the virtual view of the agent having maximum rank. Virtual view of other agents may be presented in a carousel view.

According to an embodiment of the present invention, the rank or rating given to the agent can be used to drive any number of visualisations, including the use of the carousel of live video feeds which can be driven by the rank or scoring assigned to each agent.

Further, the driving module 240 provides red and green light flashing to a user or manager of the agents. The red light flashing with a virtual view of agent may indicate that the agent requires attention of the user or manager. A green light may indicate that agent is performing well and does not require attention of the user.

The video feed module 244 is configured to provide real-time video of agent having maximum rank. In an embodiment of the present invention, if the manager wants to go in detail, the manager can click on the virtual view of agent, and the video feed module 244 may provide the real-time video of the agent. In an embodiment, the source of the real-time video may be WebRTC. WebRTC architecture may endow browsers (i.e., browser used by manager, and browser used by agent) with real-time communication capabilities via javascript Application Programming Interfaces (APIs). The manager and the agent requiring manager assistance may directly communicate, and the manager may provide required assistance to the agent. In another embodiment, the source of the real-time video may be different than WebRTC such as a video conference, a video call and so forth (for example, Skype video).

The video feed module 244 is configured to enable the manager to open a detailed view for a day or week's activities of the agent having maximum rank in an embodiment of the present invention. The manager may open and see a detailed view of the agent's activities for a particular day or for a week as needed that may help the manager to provide assistance to the agent. Further, the detailed view of the agent's activities and the assistance provided by the manager to the agent may be used as a basis to train other agents and to improve effectiveness of the contact center.

The video feed module 244 may further integrate multiplexing video of the agents using WebRTC to activate and bring to the front the highest ranked agent (or agent most in need of attention). The video feed module 244 may further display the other agent video feeds in a carousel where the user can quickly switch from one to another (for example, like a view of static album covers). Further, the video may be overlaid with the real-time statistics contributing to the relevant agent score. As the user moves through the carousel the background cube view may move, indicating the position of the agent, thus allowing the manager identify the location should he/she need to go to that agent's desk.

Figure 3:
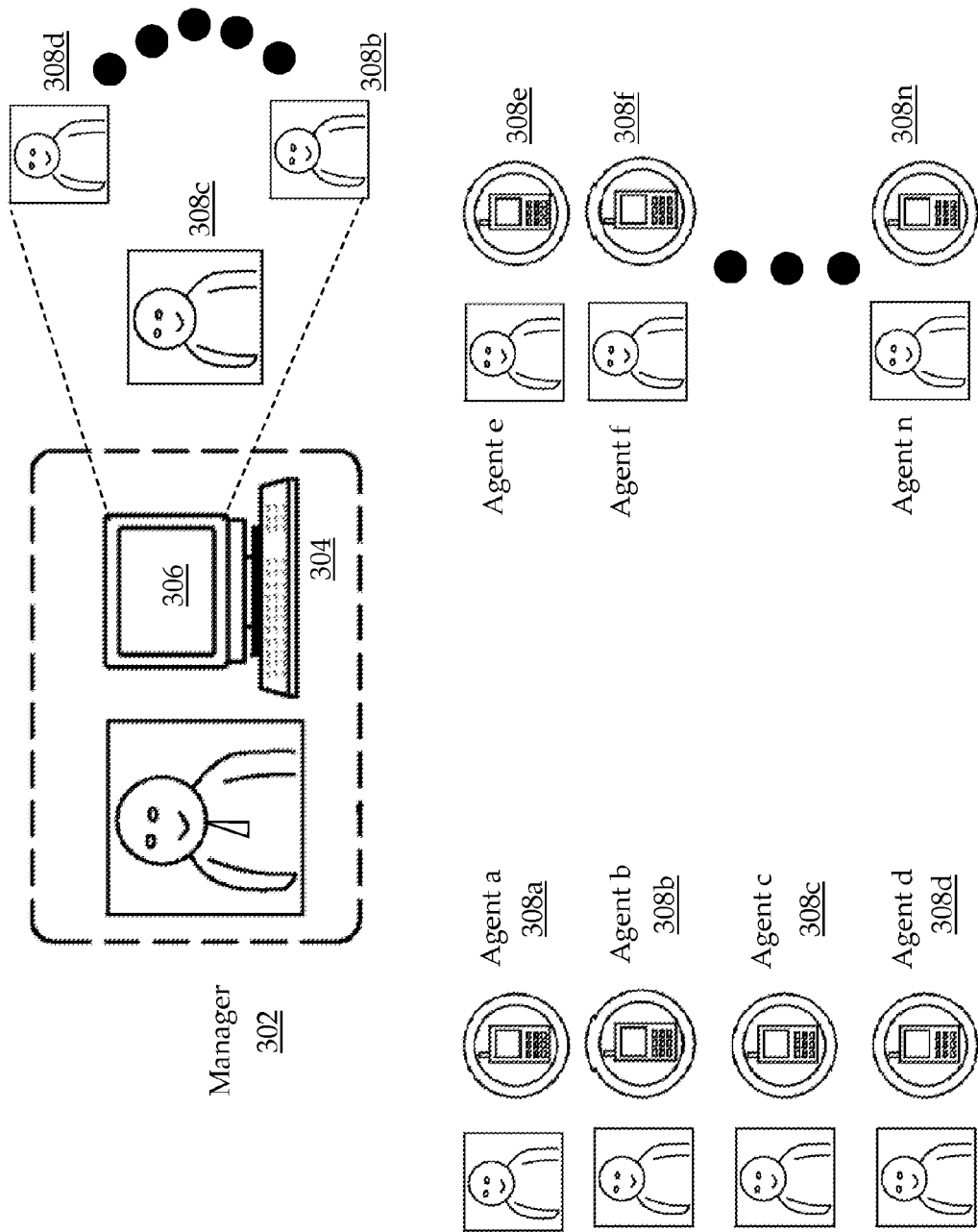
FIG. 3 is an exemplary view of a manager receiving virtual view of agents of a contact center, in accordance with an embodiment of the present invention.

FIG. 3 is an exemplary view of a manager receiving a virtual view of agents of a contact center. The manager 302 is sitting in front of a display system 304, and is looking at virtual view of agents in a display 306 of the display system 304. In an embodiment, the display system 304 may include a desktop computer, a laptop, a tablet, and a smart phone etc. Further, in an embodiment, the manager 302 may be sitting at his desk inside the contact center. In another embodiment, the manager 302 may be sitting at his home or any other place outside the contact center, and may be receiving the virtual view of the agents. The agents may include agent a (i.e., 308a), agent b (i.e., 308b) agent c (i.e., 308c) . . . agent n (i.e., 308n). The agents (hereinafter, generally referred as agent 308 or agents 308) are sitting at their own desks, and handling (receiving as well making) calls from customer. The agents 308 are associated with key performance indicators, and each of the key performance indicators are associated with predefined thresholds, as discussed above. In an embodiment, if no threshold associated with any KPI is breached, the virtual view driving system 224 presents a default view of agents, wherein the agents are periodically displayed according to their location, names or some other predefined rules. In another embodiment of the present invention, if any KPI associated with one agent or multiple agents is breached, the virtual view driving system 224 presents a view or display of an agent requiring assistance of the manager first. To determine the agent 308 requiring most urgent attention of the manager 302, the virtual view driving system 224 calculates a rank (as discussed above) of each of the agent 308 whose KPIs have been breached from thresholds. The agent 308 having maximum rank is the agent whose KPIs have gone much below or much above the threshold level than other agents, and/or whose number of breached KPIs is more than other agents. Hence, the manager 302 can locate the agent 308 requiring most urgent attention, and may provide assistance to the agent 308 so that key performance indicators associated with agent 308 are restored to an acceptable level. The virtual view driving system 224 may also display a red flag to indicate agents 308 whose KPIs have gone outside the threshold level, and a green flag to indicate agents 308 performing good or within acceptable level. The virtual view driving system 224 may also provide a corresponding background (which may be different for each agent 308 depending on his physical location in the contact center) of the agent location, so that the manager 302 can readily locate and physically go to the agent location, if required. The virtual view driving system 224 may also determine locations of each agent 308 by using readers (discussed above) to read badges of the agents to track location of the agents 308. Hence, even if the contact center utilizes hot desking, the virtual view driving system 224 may provide an exact location of the agents 308 inside the contact center to the manager 302, so that the manager 302 can physically go at the agent's desk, if required.

Further, the virtual view driving system 224 may further provide real-time video of agents 308 to the manager 302. In an embodiment, WebRTC may be utilized to enable the agent 308 and the manager 302 to communicate directly. In another embodiment, a 'video call' may be arranged to enable the agent 308 and the manager 302 to communicate directly to solve issues and bring back KPIs associated with the agent within limits. The agent 308 having maximum rank or requiring most urgent attention of the manager 302 may be displayed in center of the display 306. Videos of other agents 308 may be shown to the manager 302 in a carousel view, as shown in FIG. 3.

The manager 302 can interact with their agents 308 based on a rank of agents without leaving their desks, or even from a remote location, getting contextual real-time statistics on individual agents, allowing managers to intuitively navigate and discover the source of a problem which may be agent-originated in a call center.

Figure 4:
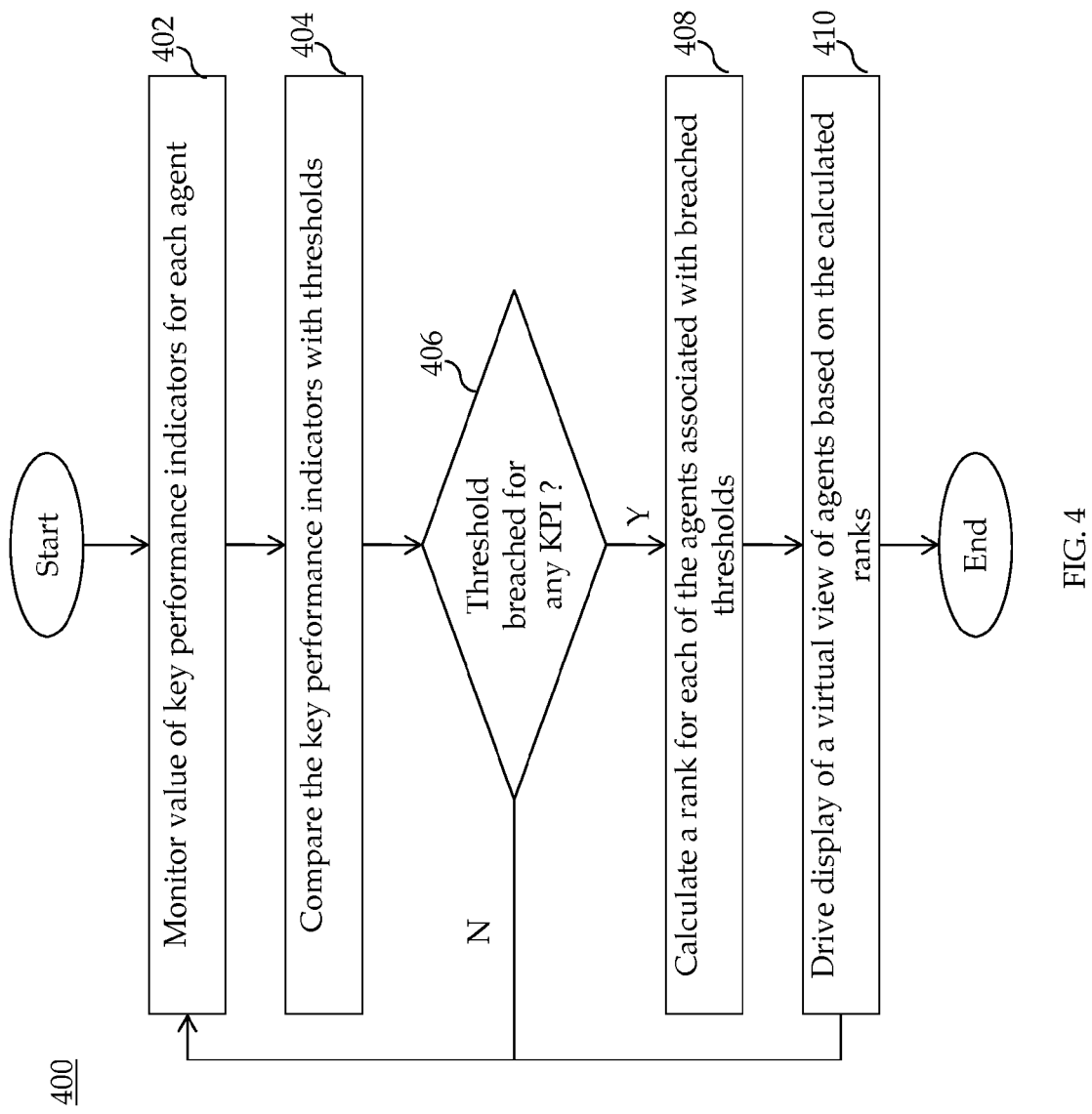
FIG. 4 is a flowchart of a method for driving virtual view of agents in a contact center, in accordance with an embodiment of the present invention.

FIG. 4 is a flowchart of a method 400 for driving a display of a cubic view in a contact center. At step 402, key performance indicators associated with each agent are monitored. In an embodiment, Key Performance Indicators (KPIs) include revenue, estimated wait time, actual wait time, average speed of answer, throughput, agent utilization, agent performance, customer satisfaction, service level agreement, average talk time, total average call handling time, agent responsiveness etc.

At step 404, the key performance indicators are compared with corresponding thresholds. According to an embodiment of the present invention, each of the KPIs is associated with a threshold value, which may be predefined and decided based upon a service level agreement or desired operational efficiency of the contact center. The threshold associated with a KPI may indicate an acceptable value of KPI.

At step 406, it is determined whether any threshold for any key performance indicators of one or more agents has been breached. In an embodiment, an operating status of each of the KPI is compared with their respective thresholds. If no threshold has been breached, the method 400 returns to step 402. In an embodiment, if no threshold has been breached, the virtual view may be driven based upon a default setting (for example, alphabetically, or location wise view of agents). If one or more thresholds have been breached, the method 400 proceeds towards step 408.

For example, if threshold associated with an agent for wait time is 20 seconds, then if the agent is answering calls within 20 seconds, it is fine. Otherwise, if the agent takes longer than 20 seconds, then the threshold associated with this KPI has been breached by the agent. In an embodiment of the present invention, the monitoring and detecting may be performed by the monitoring module 232.

At step 408, a rank of the one or more agents (which are associated with breached thresholds of KPIs) is calculated based on predefined rules (for example, a formula or an algorithm). The calculated rank may indicate a severity level of attention required by the agent. In an embodiment of the present invention, an agent having maximum rank indicates an agent requiring most urgent attention of a manger of the contact center. In an embodiment of the present invention, the rank may be calculated by the ranking module 236.

Thereafter, at step 410, the display or view of agents is driven based on the calculated rating of agents. In an embodiment, the agent having maximum rank may be displayed first. Further, a virtual view of other agents may be presented in a carousel view. In an embodiment of the present invention, the display may be driven by the driving module 240. In another embodiment of the present invention, the method 400 returns to step 402 to continue the monitoring of the key performance indicators of the agents in the contact center.

Further, in an optional step, a real-time video of an agent may be displayed to the user. For example, if the user or manager wants to go in detail or want to directly interact with an agent, then the user may select the agent, and the real-time video of the agent may be displayed to the user. The user may navigate and discover a source of a problem, which may be agent originated. The user may also identify the location of the agent and may physically go at his desk, if required.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example, in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A virtual view driving system to drive a virtual view of agents in a contact center, comprising:
   a processor;
   a computer-readable medium coupled to the processor, the medium storing computer-executable instructions comprising:
   a set of monitoring programmed instructions that causes the processor to monitor and to detect a breach in a threshold value associated with at least one key performance indicator of at least one agent from a plurality of agents;
   a set of ranking programmed instructions that causes the processor to calculate a rank of at least one agent among the plurality of agents based on predefined rules, wherein the rank of the at least one agent is calculated on detection of said breach; and
   a set of driving programmed instructions that causes the processor to drive a display of the virtual view of the plurality of agents based on the calculated rank of the at least one agent, wherein the virtual view comprises a photorealistic view of the plurality of agents.

2. The virtual view driving system of claim 1, wherein the key performance indicators comprise one of an average revenue, an estimated wait time, an actual wait time, an average speed of answer, a throughput, an agent utilization, an agent performance, a customer satisfaction, a service level agreement, an average talk time, a total average call handling time, or an agent responsiveness.

3. The virtual view driving system of claim 2, wherein each of the key performance indicators is associated with a threshold value.

4. The virtual view driving system of claim 1, wherein the set of ranking programmed instructions causes the processor to calculate rank of at least one agent based upon a predefined weighting, and a ratio of absolute value of threshold breach to a threshold value.

5. The virtual view driving system of claim 1, wherein the set of driving programmed instructions causes the processor to drive a display of an agent having a highest rank among the plurality of agents.

6. The virtual view driving system of claim 5, wherein the highest rank indicates an agent requiring more urgent attention than rest of the plurality of agents.

7. The virtual view driving system of claim 5, wherein the set of driving programmed instructions causes the processor to drive a display of the virtual view of the plurality of agents in a carousel view.

8. The virtual view driving system of claim 1, wherein the virtual view indicates an actual physical location of agents inside the contact center.

9. The virtual view driving system of claim 1, further comprising a set of video feed programmed instructions that causes the processor to drive a real-time video of an agent having a highest rank.

10. The virtual view driving system of claim 9, wherein the real-time video is one of a WebRTC video, a video conference, or a video call.

11. The virtual view driving system of claim 1, wherein the set of video feed programmed instructions causes the processor to drive a display of a detailed view of activities of an agent having a highest rank.

12. A computer-implemented method to drive a virtual view of agents in a contact center, the computer-implemented method comprising:
   monitoring, by a processor, key performance indicators associated with a plurality of agents;
   detecting, by the processor, a breach in a threshold value associated with at least one key performance indicator of at least one agent from the plurality of agents;
   calculating, by the processor, a rank of at least one agent among the plurality of agents based on predefined rules, wherein the rank of the at least one agent is calculated on detection of said breach; and
   driving, by the processor, a display of the virtual view of the plurality of agents based on the calculated rank of the at least one agent, wherein the virtual view comprises a photorealistic view of the plurality of agents.

13. The computer-implemented method of claim 12, wherein the key performance indicators comprise one of an average revenue, an estimated wait time, an actual wait time, an average speed of answer, a throughput, an agent utilization, an agent performance, a customer satisfaction, a service level agreement, an average talk time, a total average call handling time, or an agent responsiveness.

14. The computer-implemented method of claim 12, wherein the calculating comprises calculating, by the processor, the rank of at least one agent based upon a predefined weighting, and a ratio of absolute value of threshold breach to a threshold value.

15. The computer-implemented method of claim 12, wherein the driving by the processor comprises providing a display of at least one agent having a highest rank among the plurality of agents.

16. The computer-implemented method of claim 15, wherein the highest rank indicates an agent who requires more urgent attention than rest of the plurality of agents.

17. The computer-implemented method of claim 12, further comprising displaying by processor, the virtual view of the plurality of agents in a carousel view.

18. The computer-implemented method of claim 12, further comprising providing, by the processor, a real-time video of an agent having a highest rank.

19. The computer-implemented method of claim 18, wherein the real-time video comprises one of a WebRTC video, a video conference, or a video call.

* * * * *